United States Patent
Economy et al.

(10) Patent No.: US 6,706,361 B1
(45) Date of Patent: Mar. 16, 2004

(54) POLYMERIC ION EXCHANGE FIBERS

(75) Inventors: James Economy, Urbana, IL (US);
Lourdes Dominguez, Urbana, IL (US);
Kelly Benak, Champaign, IL (US)

(73) Assignee: Board of Trustees of University of Illinois, Urbana, IL (US)

(*) Notice: Subject to any disclaimer, the term of this patent is extended or adjusted under 35 U.S.C. 154(b) by 0 days.

(21) Appl. No.: 09/599,811

(22) Filed: Jun. 21, 2000

(51) Int. Cl.[7] .............................................. B32B 21/02
(52) U.S. Cl. ....................... 428/92.4; 210/660; 210/679
(58) Field of Search .................... 428/292.4; 210/660, 210/679

(56) References Cited

U.S. PATENT DOCUMENTS

| | | | | |
|---|---|---|---|---|
| 2,670,334 A | * | 2/1954 | D'Alelio | |
| 3,373,104 A | * | 3/1968 | Ryan | 210/673 |
| 3,520,805 A | * | 7/1970 | Ryan | 588/20 |
| 3,853,721 A | * | 12/1974 | Darlington et al. | 205/519 |
| 4,045,338 A | | 8/1977 | Miyamoto et al. | |
| 4,265,768 A | | 5/1981 | Beasley et al. | |
| 4,313,832 A | * | 2/1982 | Shimizu et al. | 210/663 |
| 4,513,032 A | * | 4/1985 | Klinkowski | 427/336 |
| 4,569,756 A | * | 2/1986 | Klein | 210/193 |
| 4,693,828 A | * | 9/1987 | Yoshioka et al. | 210/679 |
| 5,318,846 A | | 6/1994 | Bruening et al. | |
| 5,350,523 A | | 9/1994 | Tomoi et al. | |
| 5,424,042 A | * | 6/1995 | Mason et al. | 422/159 |
| 5,547,760 A | | 8/1996 | Tarbet et al. | |
| 5,580,770 A | * | 12/1996 | DeFilippi | 435/180 |
| 5,834,114 A | | 11/1998 | Economy et al. | |
| 6,124,114 A | * | 9/2000 | Hoffman et al. | 435/69.1 |
| 6,130,175 A | * | 10/2000 | Rusch et al. | 442/77 |
| 6,283,029 B1 | * | 9/2001 | Tashiro et al. | 312/265.3 |

FOREIGN PATENT DOCUMENTS

| | | |
|---|---|---|
| DE | 3339756 A1 | 5/1985 |
| EP | 0 036 584 A2 | 9/1981 |
| EP | 0 045 824 A1 | 2/1982 |
| EP | 0 285 321 A2 | 10/1988 |
| EP | 0 608 539 A1 | 8/1994 |
| EP | 0 630 685 A1 | 12/1994 |
| WO | WO 99/61384 | 12/1999 |

OTHER PUBLICATIONS

"View from the Rising Sun" by Masanori Horie, published at www.geocities.com/colosseum/bench/5904/jp091698.html, (last modified Jun. 8, 1999).*
Search Report for Patent Cooperation Treaty application No. PCT/US 01/41081, Date of Mailing Nov. 9, 2001, 7 pages.
Search Report for Patent Cooperation Treaty application No. PCT/US 01/19952, Date of Mailing Nov. 14, 2001, 8 pages.
Search Report for Patent Cooperation Treaty application No. PCT/US 01/19946, Date of Mailing Nov. 14, 2001, 8 pages.
"Ion Exchange", Encyclopedia of Chemical Technology, vol. 13, pp 685–689 and 694 (1981).
Konrad Dorfer—"Ion Exchangers", Walter de Gruyter Berlin–New York, pp. 28–45 and 206–285 (1991).
F. Rodriguez, "Table 15.11 Aldehyde condensation products", Principles of Polymer Systems, Fourth Edition, p. 638, 1996.

* cited by examiner

*Primary Examiner*—Chester T. Barry
(74) *Attorney, Agent, or Firm*—Sonnenschein Nath & Rosenthal LLP

(57) ABSTRACT

Ion exchange resin composite fibers include a substrate fiber, and an ion exchange resin, on the substrate fiber. The ion exchange resin composite fibers exhibit greatly increased kinetic rates of reaction and regeneration.

18 Claims, 2 Drawing Sheets

Capacities Resulting from Varied Sulfonation Treatments

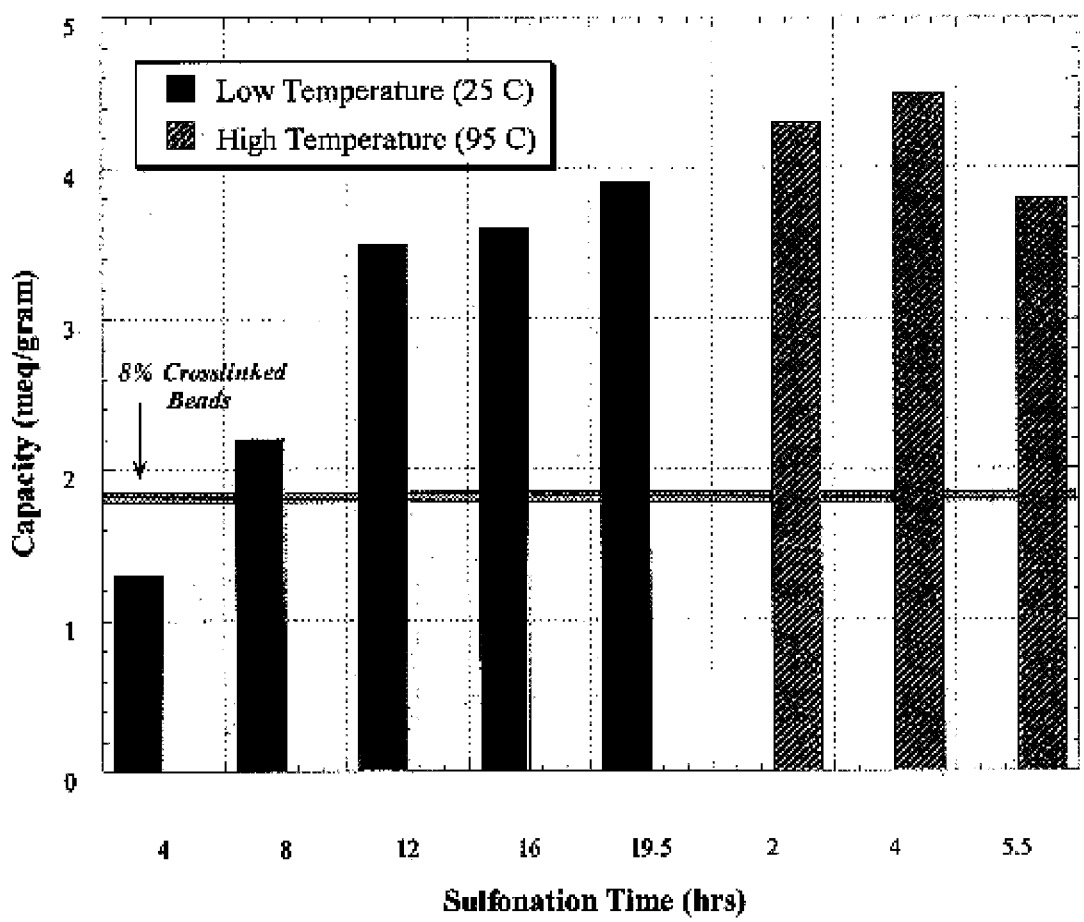
Figure 1: Capacities Resulting from Varied Sulfonation Treatments

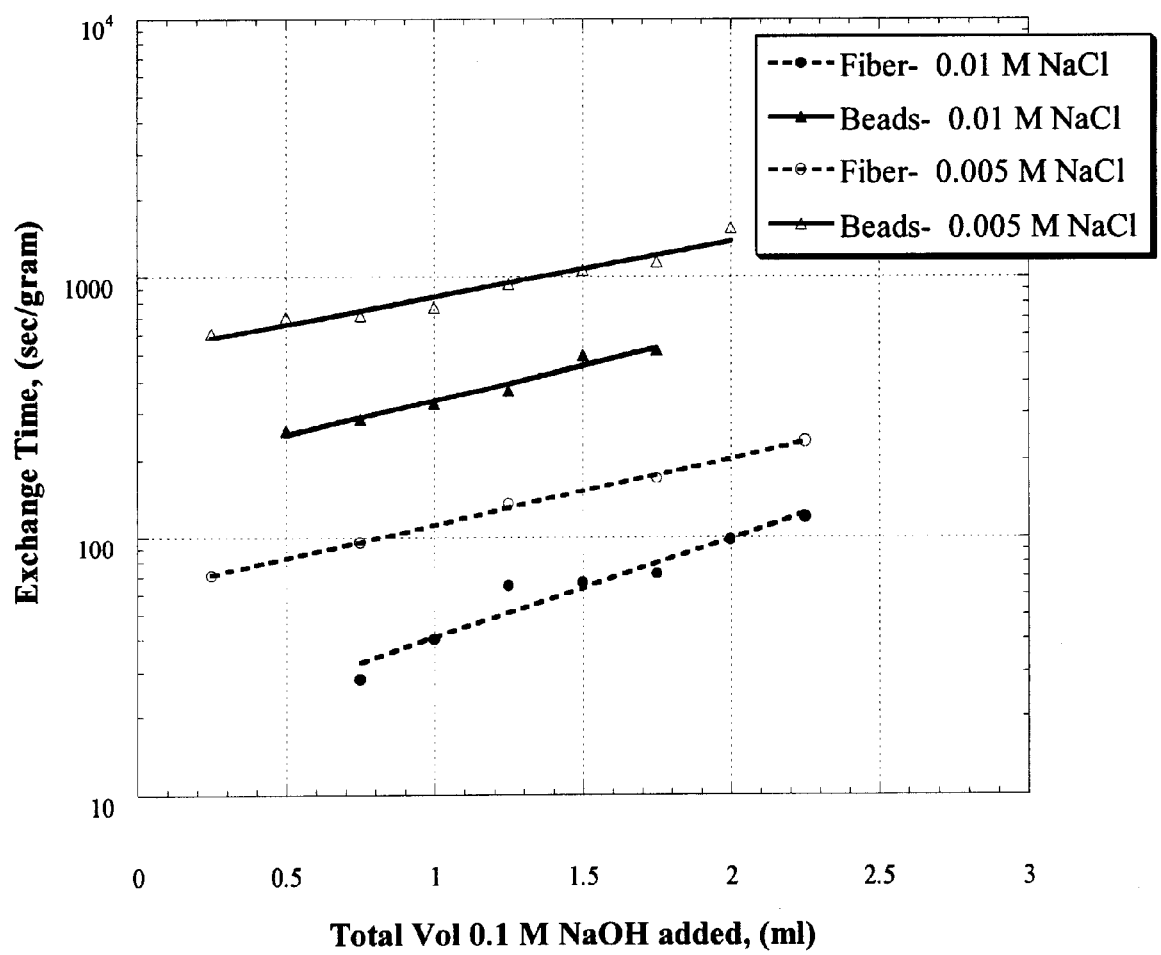
Figure 2: Batch Rates of Exchange at Varying Saline Concentration

POLYMERIC ION EXCHANGE FIBERS

FEDERALLY SPONSORED RESEARCH OR DEVELOPMENT

The subject matter of this application was in part funded by the National Science Foundation (Grant no. DMR-97-12489; UFAS No. 1-5-31414). The government may have certain rights in this invention.

BACKGROUND

The present invention relates to ion exchange materials.

Ion exchange materials have been used for purification and demineralization. These materials have a three-dimensional network to which ions are attached. In ion exchange resins, the three-dimensional network is a polymer. In carbon ion exchangers, the three-dimensional network is activated carbon.

Ion exchange resins have been known for almost sixty years ("Ion Exchangers"; Dorfner, K. (Ann Arbor Science Publishers, Inc. 1972)). The three-dimensional network helps preserve the structural integrity of the material, usually in the form of beads, while the ions provide exchange sites. A large variety of ion exchange resins are described in "Encyclopedia of Chemical Technology" Kirk-Othmer, 3rd ed., vol. 13, pp. 685–93 (1981); and "Ion Exchangers" ed. Konrad Dorfner, pp. 28–44, and pp. 206–84 (Walter de Gruyter, 1991).

These materials suffer from a number of disadvantages. During the activation of the resin (the stage of attachment of the ions), solvent must be used to pre-swell the cross-linked resin, to reduce the effects of osmotic shock. Furthermore, the beads are very susceptible to fracture and breakage and must be kept wet at all times. Also, pre-swelling prior to service is often required, increasing shipping costs. Finally, there is also a need for ion exchange resins having higher contact efficiencies, speed of regeneration, and longer service life.

Glass or mineral fibers, coated with activated carbon, have been prepared. These materials are described in U.S. Pat. No. 5,834,114. Glass or mineral fibers coated with activated carbon are described as being prepared by coating a glass or mineral fiber substrate with a resin, cross-linking the resin, heating the coated fiber substrate and resin to carbonize the resin, and exposing the coated fiber substrate to an etchant to activate the coated fiber substrate.

BRIEF DESCRIPTION OF THE DRAWINGS

FIG. 1 is a graph showing the capacities resulting from varied sulfonation treatments of samples and comparative samples; and FIG. 2 is a graph showing batch rates of exchange at varying saline concentrations of samples and comparative samples.

BRIEF SUMMARY

In a first aspect, the present invention includes a composite, containing (i) a substrate fiber, and (ii) an ion exchange resin, on the substrate fiber.

In a second aspect, the present invention includes a method of making a composite, including forming an ion exchange resin from a resin. The resin is on a substrate fiber.

The term "ion exchange resin" means a resin that contains an ionic group, thus allowing the material to exchange ions with a solvent, but also means a resin that contains groups capable of chelating ions.

DETAILED DESCRIPTION

The ion exchange resin composite fibers exhibit greatly increased kinetic rates of reaction and regeneration, as compared with commercially available ion exchange resins in the form of beads. Furthermore, the strength is increased by the substrate fiber, reducing fracture and breakage, and allowing a larger variety of forms to be produced. In addition, the thickness of the ion exchange resin on the composite may be very thin, providing excellent kinetics, and preferably the need for solvents for activation or prior to end-use may be eliminated, while thicker coatings may provide much higher capacities.

The substrate fiber may include any material that can tolerate the conditions necessary to form the structure. Examples include natural fibers, HEPA filters, e-glass fibers, synthetic fibers used in clothing, polyesters, polyethylene, polyethylene terephthalate, nylon 6, nylon 66, polypropylene, KEVLAR™, liquid crystalline polyesters, and syndiotactic polystyrene. Other examples include natural and synthetic fibers, for example: glass fibers; mineral fibers such as asbestos and basalt; ceramic fibers such as $TiO_2$, SiC, and BN; metal fibers such as iron, nickel and platinum; polymer fibers such as TYVEK™; natural fibers such as cellulose and animal hair; and combinations thereof. Some preferred substrate fibers are listed in the table below.

| Company | Product Line | Description |
| --- | --- | --- |
| CRANE & CO. | Crane 230 (6.5 $\mu$m) | Non-woven Fiber Glass Mats |
| | Crane 232 (7.5 $\mu$m) | Non-woven Fiber Glass Mats |
| FIBRE GLAST | 519 (0.75 oz.) | wovens |
| | 573 (9 oz.) | wovens |
| HOLLINGSWORTH & VOSE | BG05095 HE1021 | glass paper or felts |
| JOHNS MANVILLE | DURAGLASS ® 7529 (11 $\mu$m) | non-woven fiber glass mats |
| LYDALL MANNING | MANNIGLAS ® | non-woven fiber glass mats |
| DUPONT | TYVEK ® | HDPE Spun bonded paper |

The ion exchange resin composite fibers may be present in any form. Examples include loose fibers, woven and non-woven fabrics, papers, felts and mats. The ion exchange resin composite fibers may be made from substrate fibers already present in a specific form, or the ion exchange resin composite fibers may first be prepared from loose substrate fibers, and made into the specific form. Furthermore, the ionic exchange resin may itself be used as an adhesive to hold the fibers together.

Any ion exchange resin may be used in the ion exchange resin composite fibers. A large variety of ion exchange resins are described in "Encyclopedia of Chemical Technology" Kirk-Othmer, 3rd ed., vol. 13, pp. 685–93 (1981); and "Ion Exchangers" ed. Konrad Dorfner, pp. 28–44, and pp. 206–84 (Walter de Gruyter, 1991), both of which are hereby incorporated by reference. Examples include polystyrenes such as polystyrene cross-linked with divinylbenzene, copolymers of methacrylate and styrene cross-linked with divinylbenzene, each also containing ionic or chelating groups; polyvinylpyridines; and poly(meth)acrylic acids such as polymethacrylic acid cross-linked with divinylbenzene, which may contain additional ionic or chelating groups. Preferably, the resin is a cross-linked polymer comprising phenyl groups, for example a polymer containing groups of the formula (I):

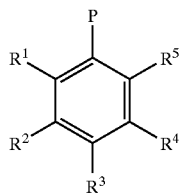
(I)

where P indicates where the group of formula (I) is attached to the polymer, and $R^1$, $R^2$, $R^3$, $R^4$, $R^5$ are each independently selected from H, halo, $C_1$–$C_{10}$ alkyl, $C_1$–$C_{10}$ haloalkyl, $C_1$–$C_{10}$ alkenyl, an ionic group and a chelating group, where at least one of $R^1$, $R^2$, $R^3$, $R^4$, $R^5$ is an ionic group or a chelating group. Examples of ionic groups are anionic groups such as —$SO_3^-$, —$COO^-$, —$PO_3^-$ and $AsO_3(H)^-$; and cationic groups such as trialkyl ammonium groups, $(R^6)_3N^+$, where each $R^6$ is independently an alkyl group (i.e. methyl, ethyl, propyl, butyl, etc.). Examples of chelating groups include hydroxyl, amino, iminodiacetate groups and thiol groups. Mixtures of different anionic groups, or cationic groups, or chelating groups are possible, as well as mixtures of anionic, cationic and/or chelating groups.

The length of the ion exchange resin composite fibers are not limited, and may be, for example, 0.01 mm to 100 m in length. The ion exchange resin composite fibers may be prepared from longer substrate fibers, then cut or chopped. Furthermore, the diameter of the ion exchange resin composite fibers are also not limited, and may be, for example 100 Å to 1 mm in diameter. Preferably, the fibers have an aspect ratio of at least 10.

The ion exchange resin of the ion exchange resin composite fibers may be present on isolated regions on the surface of the substrate fibers, may completely enclose the substrate fibers, or enclose all of the substrate fibers except the ends of the substrate fibers. For example, if the substrate fibers were completely enclosed by the ion exchange resin, then chopping would result in the ends of the fibers being exposed.

The weight ratio between the ion exchange resin and the substrate fibers in the ion exchange resin composite fibers is not limited, but does affect final properties. For example, if the amount of ion exchange resin is very large compared to the amount of substrate fibers, then the brittleness of the ion exchange resin may reduce the flexibility of the ion exchange resin composite fibers. Preferably, the ion exchange resin composite fibers include 10 to 90% by weight of ion exchange resin, more preferably 20 to 80% by weight of ion exchange resin, including 30%, 40%, 50%, 60%, and 70% by weight of ion exchange resin.

The ion exchange resin composite fibers may be prepared by coating the substrate fibers with a resin, and then converting the resin into an ion exchange resin, by introducing ionic and/or chelating groups by chemical reaction with modifying agents. Examples of resins include polystyrenes such as polystyrene cross-linked with divinylbenzene and copolymers of methacrylate and styrene cross-linked with divinylbenzene; poly (vinylbenzyl halides) such as poly (vinylbenzyl chloride) cross-linked with divinylbenzene; and poly(meth)acrylates such as polymethacrylate cross-linked with divinylbenzene. The resin may contain phenyl groups.

One method to coat the resin on the substrate fibers is to start the formation of the resin by polymerizing monomers, stop the polymerization before the polymerizing mixture becomes a gel, coat the fibers with the mixture, and then complete the polymerization. The viscosity of the polymerizing mixture can be adjusted with a solvent, so that the thickness of the coating on the fibers can be easily controlled.

In a second method, a first polymer can be formed, which is then dissolved into a solvent. Optionally, a cross-linking agent could be added to this mixture. The mixture is coated onto the fibers, and then the solvent is removed. The polymer is then cross-linked, for example by exposure to a cross-linking agent, by exposure to radiation, or activation of the optionally added cross-linking agent. The coated fibers, either before or after cross-linking, may be made into a different form, such as a mat, using the resin as an adhesive to hold the coated fibers together, for example by pressing the coated fibers together while heating.

In a third method, a resin is melted, and the melt is coated onto the fibers. Optionally, the resin may be exposed to a cross-linking agent, or exposed to radiation. Furthermore, the coated fibers may be made into a different form, such as a mat, using the resin as an adhesive to hold the coated fibers together, for example by pressing the coated fibers together while heating.

Any method may be used to coat the fibers, including dip-coating and spray coating.

An activating agent is used to form ionic or chelating groups in the resin, to form the ion exchange resin. The selection of activating agent depends on the group in the resin where the ionic group or chelating group will be formed, as well as which ionic or chelating group is desired. In the case of polystyrene, the ionic groups may be attached to phenyl groups in the polymer, such as by reaction with sulfuric acid (to attach sulfonyl groups) or in the case of poly(vinylbenzyl chloride), with trimethyl amine (to attach trialkyl ammonium groups). In the case of poly(meth) acrylates, the acid groups may be formed by saponification of the esters, by reaction with an acid. Preferably no solvent is used during the activation process, because swelling caused by the solvent may result in delamination of the resin from the fiber.

The composites may be used to purify a liquid, by contacting the liquid with the composites.

EXAMPLES

The following examples and preparations are provided merely to further illustrate the invention. The scope of the invention is not construed as merely consisting of the following examples.

Example 1

Polymerization and Activation of Cationic Resin Coated Glass Fibers

I. Polymerization:

A copolymer of styrene, 8% wt. divinylbenzene (80% mixture of m, p isomers and >17% ethylvinylbenzene, and <1% o, m, p diethylbenzene), and benzoyl peroxide initiator, were rigorously mixed and heated at 80 to 85° C. for approximately 17 to 24 minutes, or just before the gel point, and subsequently quenched in an ice bath, to form the oligomer. The fiberglass substrate CRANE 230 (6.5 µm fiber diameter) was then coated with the oligomer. The fibers were then turned occasionally to avoid pooling while sitting in air for one hour. The coated glass samples were cured at 85° C. in a Lindberg furnace under nitrogen for 4 hours. Following this procedure, a resin loading of 60–65% by weight was achieved.

II. Functionalization:

The resin-coated fibers were treated with 150-ml concentrated sulfuric acid for four hours at 85° C. with 1% silver sulfate as a catalyst under stirring. After activation, the samples were treated to a stepped-dilution rinse (50%, 25%, 12%, 6%, and 3% sulfuric acid rinse). Finally, the resin-coated fibers were rinsed with pure de-ionized water until all excess acid had been removed.

Example 2

Polymerization and Activation of Cationic Resin Coated Glass Fibers

I. Polymerization:
Same as Example 1
II. Functionalization:

The resin-coated fibers were treated with 150-ml concentrated sulfuric acid for twelve hours at 25° C. with 1% silver sulfate as a catalyst under stirring. After activation, the samples were treated to a stepped-dilution rinse (50%, 25%, 12%, 6%, and 3% sulfuric acid rinse). Finally, the resin-coated fibers were rinsed with pure de-ionized water until all excess acid had been removed.

Example 3

Polymerization and Activation of Cationic Resin Coated Glass Fibers

I. Polymerization:

A copolymer of styrene, 5 wt. % divinylbenzene (80% mixture of m, p isomers and >17% ethylvinylbenzene, and <1% o, m, p diethylbenzene), and benzoyl peroxide initiator were rigorously mixed and heated at 80 to 85° C. for approximately 17 to 24 minutes, or just before the gel point, and subsequently quenched in an ice bath, to form the oligomer. The fiberglass substrate CRANE 230 (6.5 $\mu$m fiber diameter) was then coated with the oligomer. The fibers were then turned occasionally to avoid pooling while sitting in air for one hour. The coated glass samples were cured at 85° C. in a Lindberg furnace under nitrogen for 4 hours. Following this procedure, a resin loading of 60–65% by weight is achieved.

II. Functionalization:
Same as Example 1

Example 4

Polymerization and Activation of Cationic Resin Coated Glass Fibers

I. Polymerization:

A copolymer of vinylbenzyl chloride, 8 wt. % divinylbenzene (80% mixture of m, p isomers and >17% ethylvinylbenzene, and <1% o, m, p diethylbenzene) were rigorously mixed with benzoyl peroxide initiator and heated at 80 to 85° C. for approximately 17 to 24 minutes, or just before the gel point, and subsequently quenched in an ice bath. The fiberglass substrate CRANE 230 (6.5 $\mu$m fiber diameter) was then coated with the oligomer. The fibers were then turned occasionally to avoid pooling while sitting in air for four hours. Excess monomer must be removed with a paper towel or other adsorbent. The coated glass samples were cured at 85° C. in a Lindberg furnace under nitrogen for 4 hours. Following this procedure, a resin loading of 80–90% by weight is achieved.

II. Functionalization:

The resin-coated fibers were treated with ~50 ml of trimethylamine for 45 minutes at 25° C. After activation, the samples were rinsed with approximately 200 ml of 2N HCl. Finally, the resin-coated fibers were rinsed with pure de-ionized water and placed in a vacuum furnace overnight at 65° C. to dry.

Example 5

Polymerization and Activation of Cationic Resin Coated Glass Fibers

I. Polymerization:
Same as Example 1
II. Functionalization:

The resin-coated fibers were treated with ~50 ml of trimethylamine for 20 minutes at 45° C. After activation, the samples were rinsed with approximately 200 ml of 2N HCl. Finally, the resin-coated fibers were rinsed with pure de-ionized water and placed in a vacuum furnace overnight at 65° C. to dry.

Example 6

Polymerization and Activation of Cationic Resin Coated Glass Fibers

I. Polymerization:

A copolymer of vinylbenzyl chloride, 5% wt. divinylbenzene (80% mixture of m, p isomers and >17% ethylvinylbenzene, and <1% o, m, p diethylbenzene) were rigorously mixed with benzoyl peroxide initiator and heated at 80 to 85° C. for approximately 17 to 24 minutes, or just before the gel point, and subsequently quenched in an ice bath, to form the oligomer. The fiberglass substrate Crane 230 (6.5 $\mu$m fiber diameter) was then coated with the oligomer. The fibers were then turned occasionally to avoid pooling while sitting in air for four hours. Excess monomer was removed with a paper towel or other adsorbent. The coated glass samples were cured at 85° C. in a Lindberg furnace under nitrogen for 4 hours. Following this procedure, a resin loading of 80–90% by weight is achieved.

II. Functionalization:
Same as Example 1.

Batch Capacity Experiments

The cation capacity was determined in a conventional manner. In a 150-ml beaker was added 50 ml of 1 M sodium chloride solution (excess), <0.5-g sample of dry resin coated fibers, and two drops of phenolphthalein indicator. The contents were stirred and titrated with standard 0.1-M sodium hydroxide solution. The volume of sodium hydroxide used, times the normality per gram of exchange material, is representative of the normalized loading capacity in meq/g units. The results are shown FIG. 1. The samples were prepared in the same was as Example 1, except that the time of sulfonation and/or temperature of sulfonation was varied as indicated in the figure.

Regeneration Studies

After each capacity run, samples were regenerated with a solution of 2N HCl acid, rinsed thoroughly with deionized water and thoroughly dried overnight. After each cycle, samples were weighed directly after drying to keep water adsorption to a minimum for capacity measurements. These systems were successfully regenerated for up to ten times with little to no observable weight loss or loss in activity.

Kinetics Studies

Batch kinetic tests for the polymeric coated glass fibers of Examples 1 were conducted with saline solutions of varying concentrations (0.01M and 0.005 M NaCl). The samples were vacuum dried at 62° C. After weighing, the resin coated fibers were tested bone dry. Exactly 50 ml of 0.05-M sodium chloride solution was placed in a 1 50-ml beaker with two drops of phenolphthalein indicator, and 1 ml of standard sodium hydroxide. While stirring, a known mass of dry resin-coated fabric was added and the time required to discharge the indicator (neutralize the solution) was noted. This step was repeated until the indicator no longer discharged. The comparative polymeric beads were from Purolite—Type C-150H. The results are shown in FIG. 2.

Obviously, numerous modifications and variations of the present invention are possible in light of the above teachings. It is therefore to be understood that within the scope of the appended claims, the invention may be practiced otherwise than as specifically described herein.

What is claimed is:

1. A composite, consisting essentially of:
   (i) substrate fibers, and
   (ii) an ion exchange resin, coated on said substrate fibers;
      wherein said substrate fibers comprise a member selected from the group consisting of glass, mineral, ceramic, metal, natural fibers, and mixtures thereof, and
      said ion exchange resin comprises a cross-linked polymer comprising phenyl groups.

2. The composite of claim 1, wherein said ion exchange resin comprises ionic groups.

3. The composite of claim 2, wherein said ionic groups are selected from the group consisting of sulfonic groups and trialkyl ammonium groups.

4. The composite of claim 2, wherein said ion exchange resin comprises polystyrene cross-linked with divinylbenzene.

5. The composite of claim 4, wherein said substrate fibers comprise glass.

6. The composite of claim 1, wherein said ion exchange resin comprises chelating groups.

7. The composite of claim 1, wherein said substrate fibers are in the form of one member selected from the group consisting of fabrics, papers, felts and mats.

8. A method of purifying a liquid, comprising:
   contacting a liquid with the composite of claim 7.

9. A method of purifying a liquid, comprising:
   contacting a liquid with the composite of claim 7.

10. A method of purifying a liquid, comprising:
    contacting a liquid with the composite of claim 1.

11. A method of purifying a liquid, comprising:
    contacting a liquid with the composite of claim 1.

12. A method of making a composite, comprising:
    coating substrate fibers with a resin;
    cross-linking the resin; and
    introducing ionic and/or chelating groups into the cross-linked resin by chemical reaction with an activating agent to convert the cross-linked resin into an ion exchange resin;
    wherein said cross-linked resin comprises a cross-linked polymer comprising phenyl groups.

13. The method of claim 12, wherein said activating agent is selected from the group consisting of sulfuric acid and trimethyl amine.

14. The method of claim 12, wherein said substrate fibers comprise a member selected from the group consisting of glass, polymer, and mixtures thereof.

15. The method of claim 12, wherein said substrate fibers are in the form of one member selected from the group consisting of fabrics, papers, felts and mats.

16. The method of claim 12, wherein said resin comprises polystyrene cross-linked with divinylbenzene.

17. The method of claim 16, wherein said substrate fibers comprise glass.

18. The method of claim 17, wherein said activating agent is selected from the group consisting of sulfuric acid and trimethyl amine.

* * * * *